United States Patent
Lei et al.

(10) Patent No.: US 12,439,429 B2
(45) Date of Patent: Oct. 7, 2025

(54) METHOD AND APPARATUS FOR TRANSMITTING DOWNLINK CONTROL INFORMATION

(71) Applicant: Lenovo (Beijing) Limited, Beijing (CN)

(72) Inventors: Haipeng Lei, Beijing (CN); Xiaodong Yu, Beijing (CN); Zhennian Sun, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 321 days.

(21) Appl. No.: 18/271,575

(22) PCT Filed: Jan. 11, 2021

(86) PCT No.: PCT/CN2021/071053
§ 371 (c)(1),
(2) Date: Jul. 10, 2023

(87) PCT Pub. No.: WO2022/147825
PCT Pub. Date: Jul. 14, 2022

(65) Prior Publication Data
US 2023/0413289 A1    Dec. 21, 2023

(51) Int. Cl.
*H04W 72/232*  (2023.01)
*H04W 72/1268* (2023.01)

(52) U.S. Cl.
CPC ..... *H04W 72/232* (2023.01); *H04W 72/1268* (2013.01)

(58) Field of Classification Search
None
See application file for complete search history.

(56) References Cited

U.S. PATENT DOCUMENTS

2019/0313385 A1   10/2019  Yang
2019/0393987 A1*  12/2019  Hong ............... H04L 1/0061

FOREIGN PATENT DOCUMENTS

CN    109088707 A    12/2018
WO    2019017645 A1   1/2019

OTHER PUBLICATIONS

Huawei, "Discussion on multi-carrier scheduling using single PDCCH", 3GPP TSG RAN WG1 Meeting #103-e, R1-2007580, E-meeting [retrieved Jun. 7, 2023]. Retrieved from the Internet <https://www.3gpp.org/ftp/tsg_ran/WG1_RL1/TSGR1_103-e/Docs>., Oct. 2020, 17 Pages.

(Continued)

*Primary Examiner* — Suhail Khan
(74) *Attorney, Agent, or Firm* — FIG. 1 Patents

(57) ABSTRACT

Embodiments of the present disclosure relate to DCI format transmissions. According to some embodiments of the disclosure, a method may include: receiving a first DCI format scheduling a first data channel of a plurality of data channels on a first carrier of a plurality of carriers, wherein the first DCI format includes common scheduling information for all of the plurality of carriers and information for decoding a second DCI format; receiving the first data channel on the first carrier based on the first DCI format; decoding the second DCI format on the first data channel; and receiving a second data channel of the plurality of data channels on a second carrier of the plurality of carriers based on the second DCI format.

20 Claims, 13 Drawing Sheets

(56) References Cited

OTHER PUBLICATIONS

PCT/CN2021/071053, "International Preliminary Report on Patentability", PCT Application No. PCT/CN2021/071053, Jul. 20, 2023, 6 pages.
PCT/CN2021/071053, "International Search Report and Written Opinion", PCT Application No. PCT/CN2021/071053, Sep. 28, 2021, 7 pages.

\* cited by examiner

METHOD AND APPARATUS FOR TRANSMITTING DOWNLINK CONTROL INFORMATION

TECHNICAL FIELD

Embodiments of the present disclosure generally relate to wireless communication technology, and more particularly to downlink control information (DCI) transmissions.

BACKGROUND

Wireless communication systems are widely deployed to provide various telecommunication services such as telephony, video, data, messaging, broadcasts, and so on. Wireless communication systems may employ multiple access technologies capable of supporting communication with multiple users by sharing available system resources (e.g., time, frequency, and power). Examples of wireless communication systems may include fourth generation (4G) systems such as long term evolution (LTE) systems, LTE-advanced (LTE-A) systems, or LTE-A Pro systems, and fifth generation (5G) systems which may also be referred to as new radio (NR) systems.

In a wireless communication system, a user equipment (UE) may monitor a physical downlink control channel (PDCCH), which may carry downlink control information (DCI). The DCI may schedule data channels, such as a physical uplink shared channel (PUSCH) or a physical downlink shared channel (PDSCH).

There is a need for handling DCI transmissions in a wireless communication system.

SUMMARY

Some embodiments of the present disclosure provide a method for wireless communication performed by a user equipment (UE). The method may include: receiving a first downlink control information (DCI) format scheduling a first data channel of a plurality of data channels on a first carrier of a plurality of carriers, wherein the first DCI format includes common scheduling information for all of the plurality of carriers and information for decoding a second DCI format; receiving the first data channel on the first carrier based on the first DCI format; decoding the second DCI format on the first data channel; and receiving a second data channel of the plurality of data channels on a second carrier of the plurality of carriers based on the second DCI format.

Some embodiments of the present disclosure provide a method for wireless communication performed by a user equipment (UE). The method may include: receiving a first downlink control information (DCI) format scheduling a first data channel of a plurality of data channels on a first carrier of a plurality of carriers, wherein the first DCI format includes common scheduling information for all of the plurality of carriers; and receiving the first data channel on the first carrier based on the first DCI format, and receiving a second data channel of the plurality of data channels on a second carrier of the plurality of carriers based on the first data channel.

Some embodiments of the present disclosure provide a method for wireless communication performed by a user equipment (UE). The method may include: receiving a first downlink control information (DCI) format for decoding a second DCI format, wherein the second DCI format schedules a plurality of data channels on a plurality of carriers; decoding the second DCI format based on the first DCI format; in the case of the plurality of data channels being physical downlink shared channels (PDSCHs), receiving the plurality of data channels on the plurality of carriers; and in the case of the plurality of data channels being physical uplink shared channels (PUSCHs), transmitting the plurality of data channels on the plurality of carriers.

Some embodiments of the present disclosure provide a method for wireless communication performed by a base station (BS). The method may include: transmitting a first downlink control information (DCI) format scheduling a first data channel of a plurality of data channels on a first carrier of a plurality of carriers, wherein the first DCI format includes common scheduling information for all of the plurality of carriers and information for decoding a second DCI format; transmitting the first data channel on the first carrier based on the first DCI format; transmitting the second DCI format on the first data channel; and transmitting a second data channel of the plurality of data channels on a second carrier of the plurality of carriers based on the second DCI format.

Some embodiments of the present disclosure provide a method for wireless communication performed by a base station (BS). The method may include: transmitting a first downlink control information (DCI) format scheduling a first data channel of a plurality of data channels on a first carrier of a plurality of carriers, wherein the first DCI format includes common scheduling information for all of the plurality of carriers; and transmitting the first data channel on the first carrier based on the first DCI format, and transmitting a second data channel of the plurality of data channels on a second carrier of the plurality of carriers based on the first data channel.

Some embodiments of the present disclosure provide a method for wireless communication performed by a base station (BS). The method may include: transmitting a first downlink control information (DCI) format for decoding a second DCI format, wherein the second DCI format schedules a plurality of data channels on a plurality of carriers; transmitting the second DCI format based on the first DCI format; in the case of the plurality of data channels being physical downlink shared channels (PDSCHs), transmitting the plurality of data channels on the plurality of carriers; and in the case of the plurality of data channels being physical uplink shared channels (PUSCHs), receiving the plurality of data channels on the plurality of carriers.

Some embodiments of the present disclosure provide an apparatus. According to some embodiments of the present disclosure, the apparatus may include: at least one non-transitory computer-readable medium having stored thereon computer-executable instructions; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions may be configured to, with the at least one processor, cause the apparatus to perform a method according to some embodiments of the present disclosure.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of the preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as the 3rd generation partnership project (3GPP) 5G (NR), 3GPP long-term evolution (LTE) Release 8, and so on. It is contemplated that along with the developments of network architectures and new service scenarios, all embodiments in the present disclosure are also applicable to similar technical problems; and moreover, the terminologies recited in the present disclosure may change, which should not affect the principles of the present disclosure.

Figure 1:
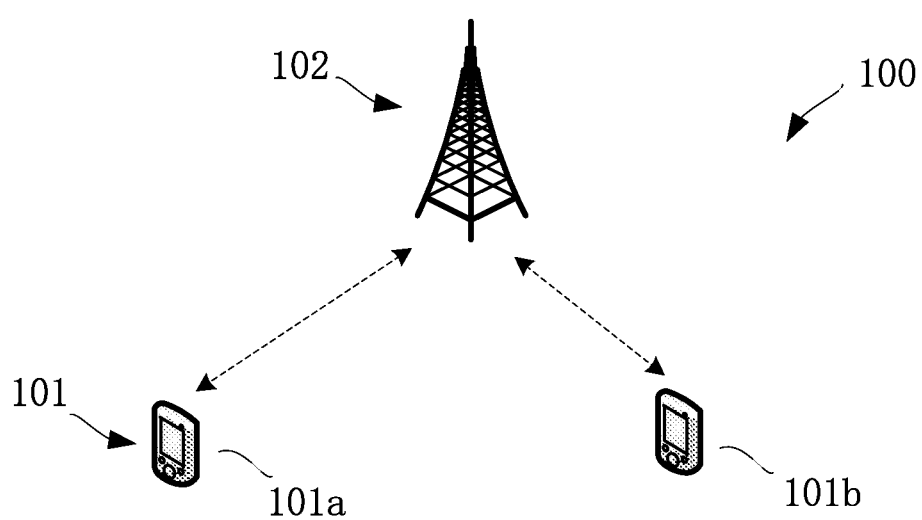
FIG. 1 illustrates a schematic diagram of a wireless communication system in accordance with some embodiments of the present disclosure.

FIG. 1 illustrates a schematic diagram of a wireless communication system 100 in accordance with some embodiments of the present disclosure.

As shown in FIG. 1, a wireless communication system 100 may include some UEs 101 (e.g., UE 101a and UE 101b) and a base station (e.g., BS 102). Although a specific number of UEs 101 and BS 102 are depicted in FIG. 1, it is contemplated that any number of UEs and BSs may be included in the wireless communication system 100.

The UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to some embodiments of the present disclosure, the UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present disclosure, the UE(s) 101 includes wearable devices, such as smart watches, fitness bands, optical head-mounted displays, or the like. Moreover, the UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE(s) 101 may communicate with the BS 102 via uplink (UL) communication signals.

The BS 102 may be distributed over a geographic region. In certain embodiments of the present disclosure, the BS 102 may also be referred to as an access point, an access terminal, a base, a base unit, a macro cell, a Node-B, an evolved Node B (eNB), a gNB, a Home Node-B, a relay node, or a device, or described using other terminology used in the art. The BS 102 is generally a part of a radio access network that may include one or more controllers communicably coupled to one or more corresponding BSs 102. The BS 102 may communicate with UE(s) 101 via downlink (DL) communication signals.

The wireless communication system 100 may be compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

In some embodiments of the present disclosure, the wireless communication system 100 is compatible with the 5G NR of the 3GPP protocol. For example, BS 102 may transmit data using an orthogonal frequency division multiple (OFDM) modulation scheme on the DL and the UE(s) 101 may transmit data on the UL using a discrete Fourier transform-spread-orthogonal frequency division multiplexing (DFT-S-OFDM) or cyclic prefix-OFDM (CP-OFDM)

scheme. More generally, however, the wireless communication system 100 may implement some other open or proprietary communication protocols, for example, WiMAX, among other protocols.

In some embodiments of the present disclosure, the BS 102 and UE(s) 101 may communicate using other communication protocols, such as the IEEE 802.11 family of wireless communication protocols. Further, in some embodiments of the present disclosure, the BS 102 and UE(s) 101 may communicate over licensed spectrums, whereas in some other embodiments, the BS 102 and UE(s) 101 may communicate over unlicensed spectrums. The present disclosure is not intended to be limited to the implementation of any particular wireless communication system architecture or protocol.

In some embodiments of the present disclosure, the wireless communication system 100 may support carrier aggregation (CA), which supports a plurality of carriers for improving data rate. An individual unit frequency bound by CA is referred to as a component carrier (CC). A CC may correspond to a serving cell. CA provides the same effect as the case in which a plurality of bands, which are physically continuous or non-continuous in the frequency domain, is bound and used as a logically large band. For example, BS 102 and UE 101a may communicate with each other using spectrums allocated in a CA including a plurality of CCs. The plurality of CCs may include a primary CC and one or more secondary CCs. A primary CC may be referred to as a primary cell (PCell) and a secondary CC may be referred to as a secondary cell (SCell).

Dynamic spectrum sharing (DSS) was introduced in 3GPP release 15 (R15) with enhancements in 3GPP release 16 (R16) for LTE and NR co-existence on the same frequency. On a carrier shared by LTE and NR, the NR transmission cannot use resource elements (REs) occupied by LTE signals such as cell reference signals (CRS s) and the LTE PDCCH region, in order to avoid any interference with the LTE system. Hence, on the shared carrier, the PDCCH capacity of NR may be relatively limited. Considering that low frequency is more preferred to be configured as a PCell in a CA framework due to coverage improvement, when a carrier in a low frequency shared by LTE and NR is configured as a NR PCell, the insufficient NR PDCCH capacity on the NR PCell may result in system performance degradation, especially when more NR devices are camped on the NR PCell.

As an objective of 3GPP release 17 (R17) DSS, to solve the NR PDCCH capacity issue, a mechanism which schedules a PDSCH on a NR PCell from a PDCCH on a NR SCell is introduced. In addition, the benefits of scheduling a plurality of cells by a single DCI, for example, a single DCI on PCell or SCell scheduling a PDSCH on both a PCell and a SCell, is considered. Since a NR-only SCell is usually configured with a larger bandwidth than a NR PCell on a shared carrier, PCell scheduling for R17 NR UEs can be offloaded to the NR SCell. In this way, the network can have sufficient PDCCH capacity for scheduling NR UEs on the shared carrier.

On the other hand, supporting NR cross-carrier scheduling such as from a SCell to a PCell may require additional (for example, almost double for the same loading on both cells) PDCCH capacity for the SCell scheduling, due to the need for self-scheduling on the SCell as well cross-carrier scheduling on the (shared carrier) PCell. Thus, PDCCH capacity on the SCell may be a potential issue when a large number of UEs are configured on the SCell or the SCell is not configured with large enough bandwidth. This issue can be addressed by allowing a single DCI on a carrier to schedule PDSCHs on two (or more) carriers. For example, two PDSCHs on two carriers may be scheduled by a single DCI format, which would save PDCCH scheduling overhead.

Figure 2:
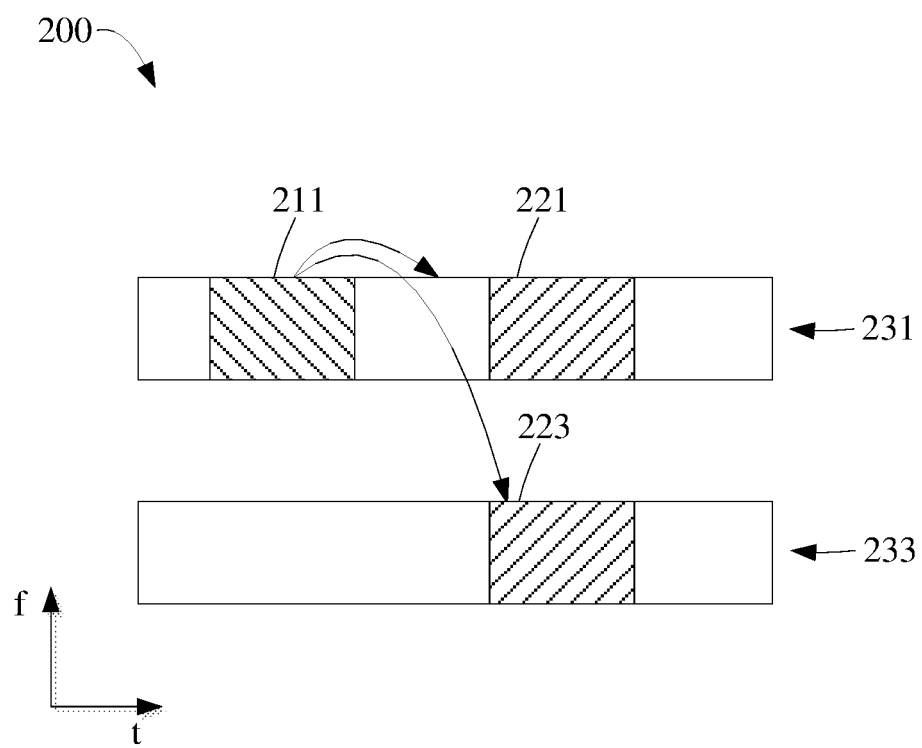
FIG. 2 illustrates a schematic diagram of a DCI format scheduling a plurality of PDSCH transmissions on a plurality of carriers in accordance with some embodiments of the present disclosure.

FIG. 2 illustrates a schematic diagram 200 of a DCI format scheduling a plurality of PDSCH transmissions on a plurality of carriers in accordance with some embodiments of the present disclosure.

Referring to FIG. 2, a plurality of CCs (including but not limited to CC 231 and CC 233) may be configured for a UE. It should be understood that the sub-carrier spacings (SCSs) of the carriers configured for a UE may be the same or different. Each of the plurality of CCs may correspond to a respective serving cell of the UE.

As shown in FIG. 2, instead of using two DCI formats to respectively schedule two PDSCHs (e.g., PDSCH 221 and PDSCH 223) on the two carriers (e.g., CC 231 and CC 233), a BS may transmit one DCI format (DCI format #1) in PDCCH 211 on CC 231 to schedule PDSCH 221 on CC 231 and PDSCH 223 on CC 233. In the example of FIG. 2, PDSCH 221 is self-scheduled on the same carrier (i.e., CC 231) with DCI format #1, and PDSCH 223 is cross-carrier scheduled on a different carrier (i.e., CC 233).

Figure 3:
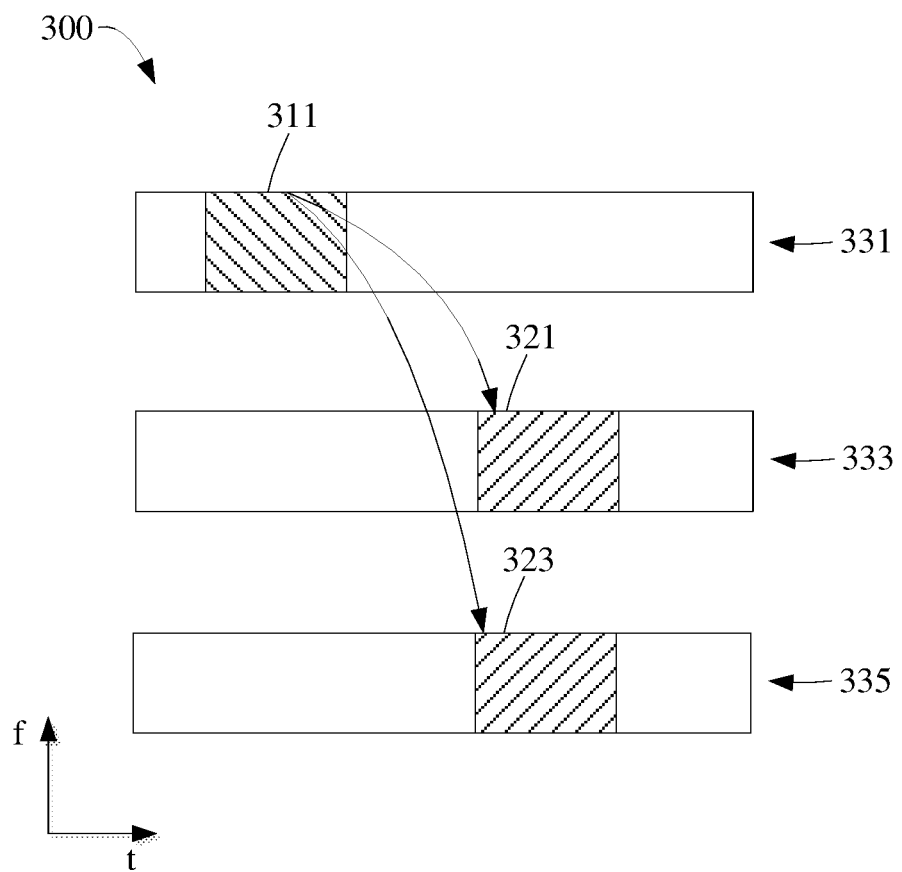
FIG. 3 illustrates a schematic diagram of a DCI format scheduling a plurality of PDSCH transmissions on a plurality of carriers in accordance with some embodiments of the present disclosure.

FIG. 3 illustrates a schematic diagram 300 of a DCI format scheduling a plurality of PDSCH transmissions on a plurality of carriers in accordance with some embodiments of the present disclosure.

Referring to FIG. 3, a plurality of CCs (including but not limited to CCs 331-335) may be configured for a UE. It should be understood that the SCSs of the carriers configured for a UE may be the same or different. Each of the plurality of CCs may correspond to a respective serving cell of the UE.

As shown in FIG. 3, a BS may transmit one DCI format (DCI format #2) in PDCCH 311 on CC 331 to schedule PDSCH 321 on CC 333 and PDSCH 323 on CC 335. In the example of FIG. 3, PDSCHs 321 and 323 are cross-carrier scheduled on a carrier (i.e., CC 331) different from the ones (i.e., CCs 333 and 335) on which the PDSCHs are scheduled.

Although a single DCI format respectively schedules two PDSCHs on two carriers in FIGS. 2 and 3, it should be appreciated by persons skilled in the art that a single DCI format may schedule any number of PDSCHs or any number of PUSCHs on any number of carriers, respectively.

In practice, the NR-only carrier and the shared carrier are much likely on different frequency bands with inter-band CA. For example, the shared carrier on a relatively low frequency band (e.g., 800 MHz) may be configured as a NR PCell (due to better coverage) and the NR-only carrier on a relatively high frequency band (e.g., 3.5 GHz) may be configured as a NR SCell. Due to the large frequency separation between the two bands, the channel conditions of the NR PCell and NR SCell are relatively less correlated. It would be difficult to assume the same link adaptation properties on the two cells and use single fields to indicate, for example, the same modulation and coding scheme (MCS), and frequency domain resource allocation as well as time domain resource allocation.

Furthermore, LTE signals such as the LTE CRSs and LTE PDCCH regions need to be avoided when scheduling a PDSCH on a shared carrier, while there is no such restriction on the NR-only carrier. Consequently, using the same field indicating the same time domain resource allocation on, for example, two carriers may lead to scheduling inflexibility to some extent. For full flexibility scheduling, for example, for two PDSCHs on two carriers using a single DCI, most or almost all the related fields in the two-carrier scheduling DCI need to be doubled except for the 24-bit cyclic redundancy check (CRC). The larger the DCI payload size, the lower the transmission reliability and less coverage. As a result, further overhead reduction would be required for the multi-carrier scheduling DCI at the cost of a potential reduction in scheduling flexibility.

Although the above issues are described with respect to a specific network architecture or application scenario, it should be appreciated by persons skilled in the art that the above issues may exist in other specific network architectures or application scenarios. For example, the above issues may not be limited to a network supported DSS. Moreover, although the above issues are described with respect to a DL case, it should be appreciated by persons skilled in the art that the above issues may exist for a UL case, for example, when using a single DCI scheduling a plurality of PUSCHs on a plurality of carriers.

Table 1 below shows an exemplary DCI payload size for two-carrier scheduling according to some embodiments of the present disclosure.

In Table 1, the "DCI field" column shows example fields of a DCI format; the "Baseline size" column shows example field sizes and DCI payload size for single-carrier scheduling; the "Shared or Separate" column shows whether the corresponding field is shared by different data channels (e.g., PDSCHs or PUSCHs) on different carriers; and the "Bit size" column shows example field sizes and DCI payload size for two-carrier scheduling. The specific definitions of the DCI fields in the context of the present disclosure are specified in 3GPP specification(s) and thus are omitted herein.

It should be understood that Table 1 is for illustrative purposes only, and should not be construed as limiting the embodiments of the present disclosure. For example, a DCI format may include fewer or more DCI fields in some other embodiments of the present disclosure. Some of the DCI fields indicated as shared or separate in Table 1 may be separate or shared in some other embodiments of the present disclosure. The bit size of one or more DCI fields may be different in some other embodiments of the present disclosure. For example, in Table 1, it is assumed that the frequency domain resource allocated for a data channel (e.g., PDSCH or PUSCH) scheduled by the DCI is 100 physical resource blocks (PRBs). Thus, the bit size of the frequency domain resource assignment (FDRA) field for single-carrier scheduling is 13, and the bit size of the FDRA field for two-carrier scheduling is 26 (i.e., 2×13). In some other embodiments of the present disclosure, the bit size of the FDRA field may be different depending on the frequency domain resource allocated for the data channel.

TABLE 1

DCI payload size for two-carrier scheduling

| DCI field | Baseline size (bits) | Shared or Separate | Bit size |
|---|---|---|---|
| Identifier for DCI formats | 1 | Shared | 1 |
| Carrier indicator | 3 | Separate | 6 |
| Bandwidth part indicator | 2 | Separate | 4 |
| Frequency domain resource assignment | 13 | Separate | 26 |
| Time domain resource assignment | 4 | Separate | 8 |
| VRB-to-PRB mapping | 1 | Shared | 1 |
| PRB bundling size indicator | 1 | Separate | 2 |

TABLE 1-continued

DCI payload size for two-carrier scheduling

| DCI field | Baseline size (bits) | Shared or Separate | Bit size |
|---|---|---|---|
| Rate matching indicator | 2 | Separate | 4 |
| ZP CSI-RS trigger | 2 | Separate | 4 |
| Modulation and coding scheme | 5 | Separate | 10 |
| New data indicator | 1 | Separate | 2 |
| Redundancy version | 2 | Separate | 4 |
| HARQ process number | 4 | Separate | 8 |
| Downlink assignment index | 4 | Shared | 4 |
| TPC command for scheduled PUCCH | 2 | Shared | 2 |
| PUCCH resource indicator | 3 | Shared | 3 |
| HARQ timing indicator | 3 | Shared | 3 |
| Antenna port(s) | 4 | Separate | 8 |
| Transmission configuration indication | 3 | Separate | 6 |
| SRS request | 2 | Shared | 2 |
| CBGTI | — | — | — |
| CBGFI | — | — | — |
| DMRS sequence initialization | 1 | Separate | 2 |
| CRC | 24 | Shared | 24 |
| Total size (bits) | 87 | | 134 |

As can be seen in above Table 1, in the case of a single DCI scheduling a single data channel, the DCI payload size (including the 24-bit CRC) may be 87 bits. In the case of a single DCI scheduling two data channels on two carriers, the DCI payload size (including the 24-bit CRC) may be 134 bits with the assumption of full scheduling flexibility. Compared to the 87-bit DCI for single data channel scheduling, the overhead increasing ratio of a single DCI for two data channel scheduling is 54% in the case of full scheduling flexibility. To achieve a block error rate (BLER) target of, for example, 1%, such 134-bit DCI would need more control channel elements (CCEs) and may lead to an increase in the PDCCH blocking rate.

Embodiments of the present disclosure provide solutions to facilitate DCI transmissions. The disclosed solutions can not only alleviate the adverse impact of a large DCI payload size, but also guarantee the existing PDCCH blind detection by a UE. More details on the embodiments of the present disclosure will be illustrated in the following text in combination with the appended drawings.

Embodiments of the present disclosure disclose a multi-stage (e.g., two-stage) DCI format for multi-carrier scheduling. For example, to schedule a plurality of data channels (PDSCHs or PUSCHs) on a plurality of carriers, the DCI content (e.g., as shown in Table 1) may be split into two parts. The first part (also referred to as "first stage DCI format") may be transmitted first in time (e.g., within an earlier OFDM symbol), the second part (also referred to as "second stage DCI format") may be transmitted later in time (e.g., within a later OFDM symbol).

In some embodiments of the present disclosure, the first stage DCI format may include specific scheduling information for one (hereinafter, "carrier #A1") of the plurality of carriers, common scheduling information for all the scheduled carriers and information for decoding the second stage DCI format. The second stage DCI format may include specific scheduling information for each of the remaining carriers of the plurality of carriers.

Various methods may be employed to determine carrier #A1. In some examples, carrier #A1 may be the carrier where the first stage DCI format is detected. In some examples, the first stage DCI format may indicate carrier

A1, for example, via the carrier indicator field. In some examples, carrier #A1 may be the carrier with the lowest or highest carrier index among all the scheduled carriers. In the case that carrier #A1 is not indicated by the first stage DCI format, the carrier indicator field may be removed from the first stage DCI format.

In some embodiments of the present disclosure, in the first stage DCI format, the specific scheduling information for carrier #A1 may include the full scheduling information, for example, at least one of time domain resource allocation (TDRA) indication, FDRA indication, MCS, hybrid automatic repeat request (HARQ) process number, new data indicator (NDI), redundancy version (RV), and transmission configuration indication (TCI).

In some embodiments of the present disclosure, in the first stage DCI format, the common scheduling information for all the scheduled carriers may include, for example, at least one of virtual resource block (VRB) to physical resource block (PRB) mapping information, sounding reference signal (SRS) request, and physical uplink control channel (PUCCH) related information such as downlink assignment index (DAI), transmission power control (TPC) information, PUCCH resource indicator (PRI), HARQ timing indicator.

In some embodiments of the present disclosure, in the first stage DCI format, the information for decoding the second stage DCI format may indicate a beta offset for adaptive rate matching the second stage DCI format on carrier #A1. The beta offset may be indicated from a set of beta offsets which may be configured by radio resource control (RRC) signaling or predefined, for example, in a standard(s).

The information for decoding the second stage DCI format may further indicate the payload size of the second stage DCI format. For example, the information for decoding the second stage DCI format may indicate the number of all scheduled carriers or the number of all scheduled carriers minus one.

In some embodiments of the present disclosure, in the second stage DCI format, specific scheduling information for each of the remaining carriers may be similar to the specific scheduling information for carrier #A1. For example, for each of the remaining carriers, the second stage DCI format may indicate at least one of TDRA indication, FDRA indication, MCS, hybrid automatic repeat request (HARQ) process number, new data indicator (NDI), redundancy version (RV), and transmission configuration indication (TCI).

Tables 2 and 3 below respectively show exemplary DCI fields of a first stage DCI format and a second stage DCI format according to some embodiments of the present disclosure. In Tables 2 and 3, it is assumed that the frequency domain resource allocated for a scheduled data channel (e.g., PDSCH or PUSCH) is 100 PRBs. It is contemplated that any number of resource blocks may be allocated for a scheduled data channel.

TABLE 2

DCI fields of a first stage DCI format

| DCI field | Size (bits) |
|---|---|
| Identifier for DCI formats | 1 |
| Carrier indicator | 3 |
| Bandwidth part indicator | 2 |
| Frequency domain resource assignment | 13 |
| Time domain resource assignment | 4 |
| VRB-to-PRB mapping | 1 |

TABLE 2-continued

DCI fields of a first stage DCI format

| DCI field | Size (bits) |
|---|---|
| PRB bundling size indicator | 1 |
| Rate matching indicator | 2 |
| ZP CSI-RS trigger | 2 |
| Modulation and coding scheme | 5 |
| New data indicator | 1 |
| Redundancy version | 2 |
| HARQ process number | 4 |
| Downlink assignment index | 4 |
| TPC command for scheduled PUCCH | 2 |
| PUCCH resource indicator | 3 |
| HARQ timing indicator | 3 |
| Antenna port(s) | 4 |
| Transmission configuration indication | 3 |
| SRS request | 2 |
| DMRS sequence initialization | 1 |
| Total number of all scheduled carriers or total number of all scheduled carriers minus one | $\lceil \log_2 N \rceil$ or $\lceil \log_2(N - 1) \rceil$ |
| Beta offset | 2 |
| CRC | 24 |

TABLE 3

DCI fields of a second stage DCI format

| DCI field | Size (bits) | Comments |
|---|---|---|
| Carrier indicator | 3 | Specific for each scheduled carrier other than carrier #A1 |
| Bandwidth part indicator | 2 | |
| Frequency domain resource assignment | 13 | |
| Time domain resource assignment | 4 | |
| PRB bundling size indicator | 1 | |
| Rate matching indicator | 2 | |
| ZP CSI-RS trigger | 2 | |
| Modulation and coding scheme | 5 | |
| New data indicator | 1 | |
| Redundancy version | 2 | |
| HARQ process number | 4 | |
| Antenna port(s) | 4 | |
| Transmission configuration indication | 3 | |
| DMRS sequence initialization | 1 | |
| CRC | 24 | |

In Table 2, "N" refers to the maximum number of scheduled carriers which can be scheduled by a single DCI format. The DCI fields in Table 3, except for the CRC field, should be set for each scheduled carrier other than carrier #A1. For example, assuming that three data channels are scheduled on carrier #A1, carrier #B1 and carrier #C1, a second stage DCI format may indicate the DCI fields (except for CRC) shown in Table 3 for carrier #B1, and the DCI fields (except for CRC) shown in Table 3 for carrier #C1, and a shared CRC. The payload size of the second stage DCI format can be determined based on the total number of scheduled carriers other than carrier #A1 and the bit size of each carrier-specific field. For example, in the case that three data channels are scheduled on three carriers, the size of a second stage DCI format according to Table 3 may be 47×2+24=118 bits.

It should be understood that Tables 2 and 3 are for illustrative purposes only, and should not be construed as limiting the embodiments of the present disclosure. For example, a first stage DCI format or a second stage DCI format may include fewer or more DCI fields in some other embodiments of the present disclosure. The bit size of one or more DCI fields in Tables 2 and 3 may be different in some other embodiments of the present disclosure. For example, the beta offset field in a first stage DCI format may have fewer or more than 2 bits. One or more fields in Table 2 that are separate or shared by the scheduled carriers may be shared or separate in some other embodiments of the present disclosure.

For example, the MCS field may be common to all scheduled carriers, and thus only need to be indicated in the first stage DCI format. The second stage DCI format may not include a MCS field for each of the remaining scheduled carrier(s). In some examples, the SRS request field may be specific to each scheduled carrier, and thus should be indicated in both the first and second stage DCI formats. That is, the first stage DCI format may indicate a SRS request associated with carrier #A1, and the second stage DCI format may indicate a SRS request associated with each of the remaining scheduled carrier(s).

In some embodiments of the present disclosure, the first stage DCI format may be transmitted on a PDCCH. The second stage DCI format may be transmitted on a data channel (e.g., a PDSCH) scheduled on carrier #A1, or on a PDCCH immediately following the first DMRS of the data channel scheduled on carrier #A1.

In some embodiments of the present disclosure, the second stage DCI format may be modulated by quadrature phase shift keying (QPSK). In some embodiments of the present disclosure, the modulation order of the second stage DCI format may be the same as that of the scheduled data channel (hereinafter, "data channel #A1") on carrier #A1. The modulated symbols of the second stage DCI format may be mapped to the symbols immediately following the front-loaded demodulation reference signal (DMRS) symbol of data channel #A1 on carrier #A1. The modulated symbols of the second stage DCI format may be mapped in an increasing order of frequency-first and time-second manner.

In some embodiments of the present disclosure, the number of resource elements (REs) for the modulated symbols of the second stage DCI format may be determined at least based on the payload size of the second stage DCI format and the beta offset indicated in the first stage DCI format. The detailed rate-matching procedure is specified in 3GPP specification TS 38.212 and can be applied here. After mapping the second stage DCI format, the modulated symbols for data channel #A1 are mapped.

In some embodiments of the present disclosure, since the decoding of the data channels on the carriers other than carrier #A1 is based on the decoding result of the second stage DCI format, which may be immediately follow the front-loaded DMRS of data channel #A1 on carrier #A1, a BS can schedule data channel #A1 on carrier #A1 earlier than other data channels on other scheduled carriers.

Figure 4:
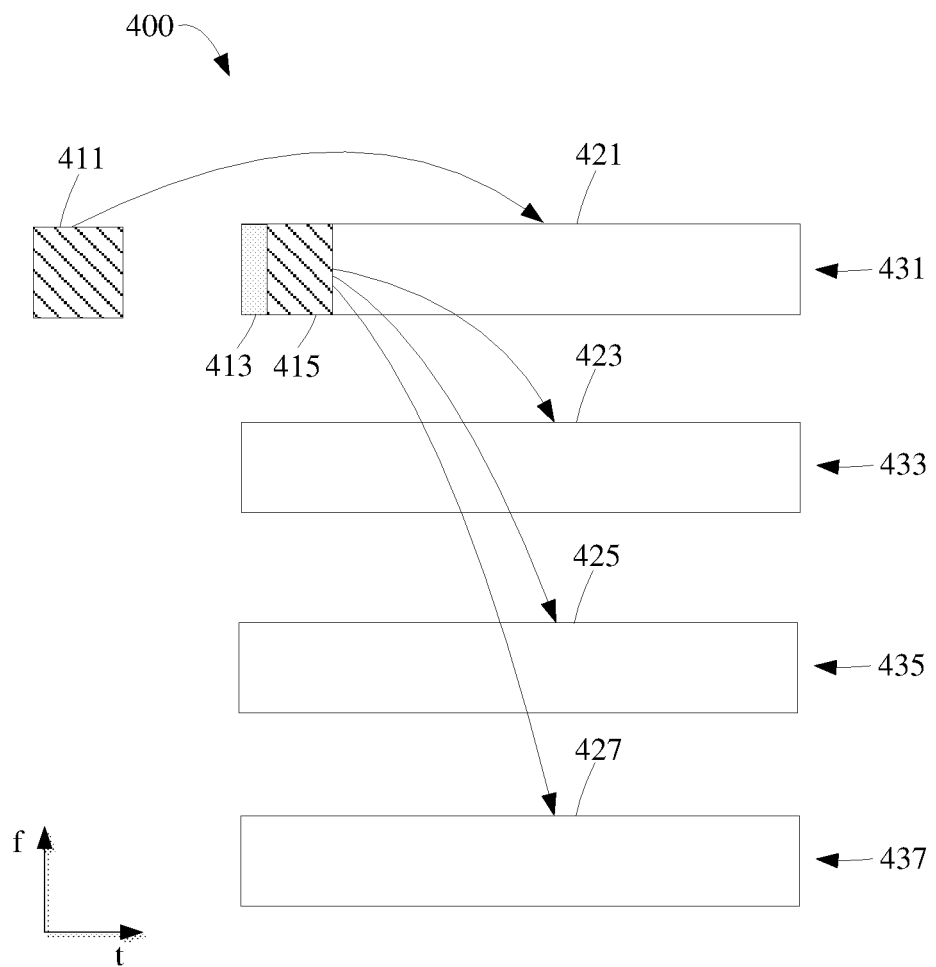
FIG. 4 illustrates a schematic diagram of a two-stage DCI format scheduling a plurality of data channels on a plurality of carriers in accordance with some embodiments of the present disclosure.

FIG. 4 illustrates a schematic diagram 400 of a two-stage DCI format scheduling a plurality of data channels on a plurality of carriers in accordance with some embodiments of the present disclosure.

Referring to FIG. 4, a plurality of CCs (including but not limited to CCs 431-437) may be configured for a UE. It should be understood that the sub-carrier spacing (SCS) of the carriers configured for the UE may be the same or different. Each of the plurality of CCs may correspond to a respective serving cell of the UE.

As shown in FIG. 4, a BS may transmit a DCI format 411 on a PDCCH on CC 431 to a UE. DCI format 411 may be a first stage DCI format as described above, and may schedule a data channel 421 (e.g., a PDSCH) on a carrier (e.g., CC 431). The UE may receive data channel 421 on CC 431 based on DCI format 411. Data channel 421 may include a front-loaded DMRS 413, followed by a DCI format 415. DCI format 415 may be a second stage DCI format as described above. The UE may decode DCI format 415 and may receive the remaining data channels (e.g., data channels 423-427) on corresponding carriers (e.g., carriers 433-437) based on DCI format 415.

In some embodiments of the present disclosure, the first stage DCI format may include specific scheduling information for one (hereinafter, "carrier #A2") of the plurality of carriers, and common scheduling information for all the scheduled carriers. The second stage DCI format may include specific scheduling information for each of the remaining carriers of the plurality of carriers. Either the first stage DCI format or the second stage DCI format may indicate the payload size of the second stage DCI format, for example, the number of all scheduled carriers or the number of all scheduled carriers minus one.

Various methods may be employed to determine carrier #A2. In some examples, carrier #A2 may be the carrier where the first stage DCI format is detected. In some examples, the first stage DCI format may indicate carrier #A2, for example, via the carrier indicator field. In some examples, carrier #A2 may be the carrier with the lowest or highest carrier index among all the scheduled carriers. In the case that carrier #A2 is not indicated by the first stage DCI format, the carrier indicator field may be removed from the first stage DCI format.

In some embodiments of the present disclosure, in the first stage DCI format, the specific scheduling information for carrier #A2 may include the full scheduling information, for example, at least one of a TDRA indication, FDRA indication, MCS, HARQ process number, NDI, RV, and TCI.

In some embodiments of the present disclosure, in the first stage DCI format, the common scheduling information for all the scheduled carriers may include, for example, at least one of VRB to PRB mapping information, SRS request, and PUCCH related information such as DAI, TPC information, PRI, HARQ timing indicator and so on.

In some embodiments of the present disclosure, in the second stage DCI format, specific scheduling information for each of the remaining carriers may be similar to the specific scheduling information for carrier #A2. For example, for each of the remaining carriers, the second stage DCI format may indicate at least one of a TDRA indication, FDRA indication, MCS, hybrid automatic repeat request (HARQ) process number, new data indicator (NDI), redundancy version (RV), and transmission configuration indication (TCI).

In some embodiments of the present disclosure, in the second stage DCI format, specific scheduling information for each of the remaining carriers may be similar to the specific scheduling information for carrier #A2. For example, for each of the remaining carriers, the second stage DCI format may indicate at least one of a TDRA indication, FDRA indication, MCS, HARQ process number, NDI, RV, and TCI.

Tables 4 and 5 below respectively show exemplary DCI fields of a first stage DCI format and a second stage DCI format according to some embodiments of the present disclosure. In Tables 4 and 5, it is assumed that the frequency domain resource allocated for a scheduled data channel (e.g., PDSCH or PUSCH) is 100 PRBs. It is contemplated that any number of resource blocks may be allocated for a scheduled data channel. In Table 5, the CRC field of may be optional.

TABLE 4

DCI fields of a first stage DCI format

| DCI field | Size (bits) |
| --- | --- |
| Identifier for DCI formats | 1 |
| Carrier indicator | 3 |
| Bandwidth part indicator | 2 |
| Frequency domain resource assignment | 13 |
| Time domain resource assignment | 4 |
| VRB-to-PRB mapping | 1 |
| PRB bundling size indicator | 1 |
| Rate matching indicator | 2 |
| ZP CSI-RS trigger | 2 |
| Modulation and coding scheme | 5 |
| New data indicator | 1 |
| Redundancy version | 2 |
| HARQ process number | 4 |
| Downlink assignment index | 4 |
| TPC command for scheduled PUCCH | 2 |
| PUCCH resource indicator | 3 |
| HARQ timing indicator | 3 |
| Antenna port(s) | 4 |
| Transmission configuration indication | 3 |
| SRS request | 2 |
| DMRS sequence initialization | 1 |
| CRC | 24 |

TABLE 5

DCI fields of a second stage DCI format

| DCI field | Size (bits) | Comments |
| --- | --- | --- |
| Carrier indicator | 3 | Specific for |
| Bandwidth part indicator | 2 | each |
| Frequency domain resource assignment | 13 | scheduled |
| Time domain resource assignment | 4 | carrier other |
| PRB bundling size indicator | 1 | than the first |
| Rate matching indicator | 2 | carrier |
| ZP CSI-RS trigger | 2 | |
| Modulation and coding scheme | 5 | |
| New data indicator | 1 | |
| Redundancy version | 2 | |
| HARQ process number | 4 | |
| Antenna port(s) | 4 | |
| Transmission configuration indication | 3 | |
| DMRS sequence initialization | 1 | |
| Total number of all scheduled carriers or total number of all scheduled carriers minus one | $\lceil \log_2 N \rceil$ or $\lceil \log_2(N - 1) \rceil$ | |
| CRC (optional) | 24 | |

The second to the last row of Table 5 indicates the payload size of the second stage DCI format (hereinafter, "payload size field"), where "N" refers to the maximum number of scheduled carriers which can be scheduled by a single DCI format. It is contemplated that in some other embodiments, the first stage DCI format may indicate the payload size of the second stage DCI format.

The DCI fields in Table 5, except for the CRC field and the payload size field, should be set for each scheduled carrier other than carrier #A2. For example, assuming that three data channels are scheduled on carrier #A2, carrier #B2 and carrier #C2, a second stage DCI format may indicate the DCI fields (except for the CRC and payload size fields) shown in Table 5 for carrier #B2, and the DCI fields (except for the CRC and payload size fields) shown in Table 5 for carrier #C2, a shared CRC, and the payload size of the second stage DCI format (optional). The payload size of the second stage DCI format can be determined based on the total number of scheduled carriers other than carrier #A2 and the bit size of each carrier-specific field.

It should be understood that Tables 4 and 5 are for illustrative purposes only, and should not be construed as limiting the embodiments of the present disclosure. For example, a first stage DCI format or a second stage DCI format may include fewer or more DCI fields in some other embodiments of the present disclosure. The bit size of one or more DCI fields in Tables 4 and 5 may be different in some other embodiments of the present disclosure. One or more fields in Table 4 that are separate or shared by the scheduled carriers may be shared or separate in some other embodiments of the present disclosure. In the case that a shared field in Table 4 is set as specific to each scheduled carrier, such field should be indicated in both the first and second stage DCI formats. In the case that a carrier-specific field in Tables 4 and 5 is set as a shared field, such field should only be indicated in the first stage DCI format.

In some embodiments of the present disclosure, the first stage DCI format may be transmitted on a PDCCH. The second stage DCI format may be transmitted in a media access control (MAC) control element (CE) of the scheduled data channel (hereinafter, "data channel #A2") on carrier #A2. The payload size information of the second stage DCI format (e.g., the number of all scheduled carriers or the number of all scheduled carriers minus one) may be carried in the MAC CE or the first stage DCI format.

In some embodiments of the present disclosure, since the decoding of the data channels on the carriers other than carrier #A2 is based on the decoding result of data channel #A2, a BS can schedule data channel #A2 on carrier #A2 earlier than other data channels on other scheduled carriers.

Figure 5:
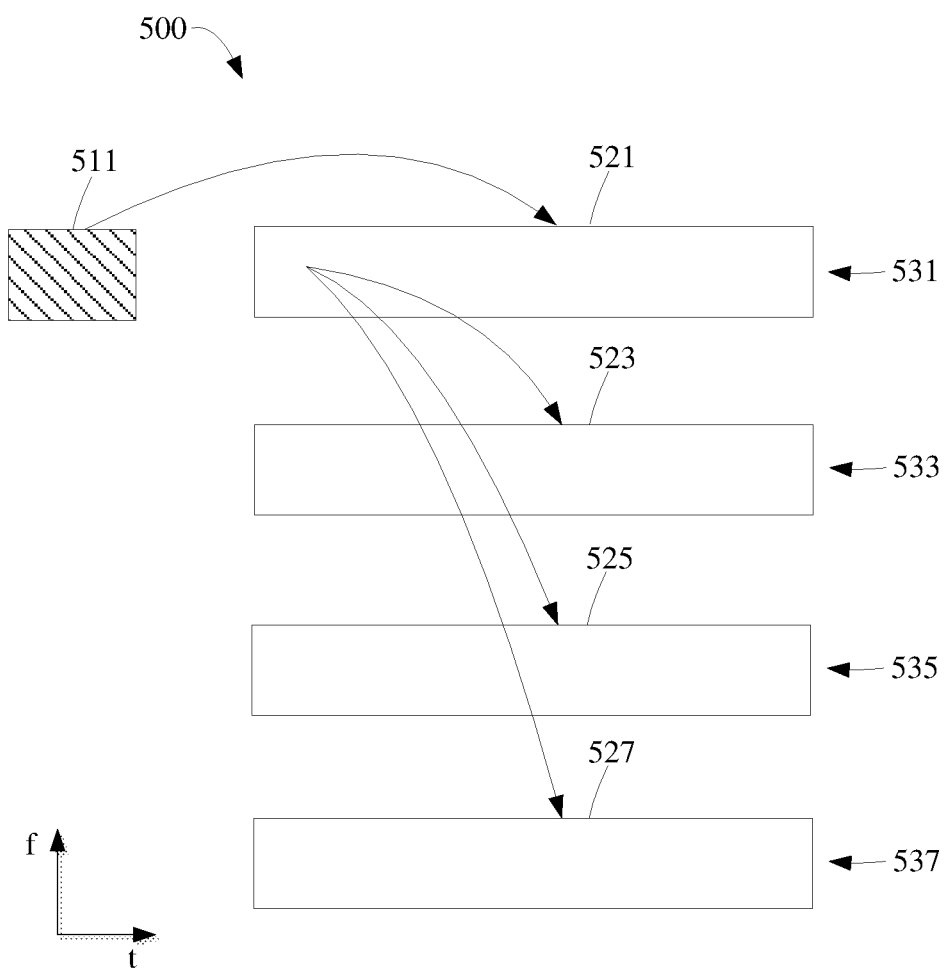
FIG. 5 illustrates a schematic diagram of a two-stage DCI format scheduling a plurality of data channels on a plurality of carriers in accordance with some embodiments of the present disclosure.

FIG. 5 illustrates a schematic diagram 500 of a two-stage DCI format scheduling a plurality of data channels on a plurality of carriers in accordance with some embodiments of the present disclosure.

Referring to FIG. 5, a plurality of CCs (including but not limited to CCs 531-537) may be configured for a UE. It should be understood that the sub-carrier spacing (SCS) of the carriers configured for the UE may be the same or different. Each of the plurality of CCs may correspond to a respective serving cell of the UE.

As shown in FIG. 5, a BS may transmit a DCI format 511 on a PDCCH on CC 531 to a UE. DCI format 511 may be a first stage DCI format as described above, and may schedule a data channel 521 (e.g., a PDSCH) on a carrier (e.g., CC 531). The UE may receive data channel 521 on CC 531 based on DCI format 511. Data channel 521 may include a MAC CE, which may include a second stage DCI format as described above. The UE may receive the remaining data channels (e.g., data channels 523-527) on corresponding carriers (e.g., carriers 533-537) based on the second stage DCI format.

In some embodiments of the present disclosure, the first stage DCI format may include information for decoding the second stage DCI format, including, but not limited to, one or more of the following fields:

(1) a carrier indicator of the second stage DCI format,
(2) a bandwidth part (BWP) indicator of the second stage DCI format,
(3) a modulation order of the second stage DCI format,
(4) TDRA information of the second stage DCI format,
(5) FDRA information of the second stage DCI format,
(6) a demodulation reference signal (DMRS) pattern of the second stage DCI format,
(7) the number of the scheduled carriers or the number of the scheduled carriers minus one, and
(8) a parameter for rate matching of the second stage DCI format on a data channel on which the second stage DCI format is carried.

In some examples, the second stage DCI format may be modulated by QPSK, and the modulation order field as listed above (item (3)) may be removed from the first stage DCI format.

The first stage DCI format may be transmitted on a PDCCH. In some examples, the second stage DCI format may be transmitted on a data channel (e.g., PDSCH) scheduled by the first stage DCI format. The parameter for rate matching as listed above (item (8)) may be applied for such transmission. The detailed rate-matching procedure for the second stage DCI format on the PDSCH can refer to 3GPP specification TS 38.212 and thus is omitted herein. In some examples, the second stage DCI format may be transmitted on a PDCCH. In the case that the second stage DCI format is transmitted on a PDCCH, it may not have an impact on the present DCI payload size budget since the payload size of the second stage DCI format can be determined based on the first stage DCI format.

In some examples, the second stage DCI format can be transmitted on the same carrier, the same BWP, or both as the first stage DCI format. The carrier indicator and BWP indicator as listed above (items (1) and (2)) may be removed from the first stage DCI format. Otherwise, the carrier indicator and BWP indicator may be indicated in the first stage DCI format.

In some embodiments of the present disclosure, the second DCI format may include scheduling information for all the scheduled carriers. Some fields in the second DCI format are common to all the scheduled carriers and some fields are specific to each scheduled carrier.

For example, the common scheduling information for all the scheduled carriers may include, but not limited to, at least one of VRB-to-PRB mapping, SRS request, and PUCCH related information, e.g., DAI, TPC, PRI, HARQ timing indicator and so on. The carrier-specific scheduling information for each scheduled carrier may include, but not limited to, at least one of a TDRA indication, FDRA indication, MCS, HARQ process number, NDI, RV, TCI, and so on.

Tables 6 and 7 below respectively show exemplary DCI fields of a first stage DCI format and a second stage DCI format according to some embodiments of the present disclosure. In Tables 6 and 7, it is assumed that the frequency domain resource allocated for a scheduled data channel (e.g., PDSCH or PUSCH) is 100 PRBs. It is contemplated that any number of resource blocks may be allocated for a scheduled data channel.

TABLE 6

DCI fields of a first stage DCI format

| DCI field | Size (bits) |
|---|---|
| Identifier for DCI formats | 1 |
| Carrier indicator | 3 |
| Bandwidth part indicator | 2 |
| Frequency domain resource assignment | 13 |
| Time domain resource assignment | 4 |
| Modulation order | 5 |
| DMRS pattern of 2nd-stage DCI | 2 |
| Total number of all scheduled carriers or total number of all scheduled carriers minus one | $\lceil \log_2 N \rceil$ or $\lceil \log_2(N-1) \rceil$ |
| CRC | 24 |

TABLE 7

DCI fields of a second stage DCI format

| DCI field | Baseline size (bits) | Common or specific |
|---|---|---|
| Identifier for DCI formats | 1 | Specific to each scheduled carrier |
| Carrier indicator | 3 | |
| Bandwidth part indicator | 2 | |
| Frequency domain resource assignment | 13 | |
| Time domain resource assignment | 4 | |
| VRB-to-PRB mapping | 1 | Common to all the scheduled carriers |
| PRB bundling size indicator | 1 | Specific to each scheduled carrier |
| Rate matching indicator | 2 | |
| ZP CSI-RS trigger | 2 | |
| Modulation and coding scheme | 5 | |
| New data indicator | 1 | |
| Redundancy version | 2 | |
| HARQ process number | 4 | |
| Downlink assignment index | 4 | Common to all the scheduled carriers |
| TPC command for scheduled PUCCH | 2 | |
| PUCCH resource indicator | 3 | |
| HARQ timing indicator | 3 | |
| Antenna port(s) | 4 | Specific to each scheduled carrier |
| Transmission configuration indication | 3 | |
| SRS request | 2 | Common to all the scheduled carriers |
| DMRS sequence initialization | 1 | Specific to each scheduled carrier |
| CRC | 24 | |

The second to the last row of Table 6 indicates the payload size of the second stage DCI format (hereinafter, "payload size field"), where "N" refers to the maximum number of scheduled carriers which can be scheduled by a single DCI format.

Regarding the DCI fields set as specific to each scheduled carrier (hereinafter, "separate DCI fields") in Table 7, the second stage DCI format may include respective separate DCI fields for each scheduled carrier. Regarding the DCI fields set as common to each scheduled carrier (hereinafter, "shared DCI fields") in Table 7, the second stage DCI format may include the shared DCI fields for all scheduled carriers. For example, assuming that three data channels are scheduled on carrier #A3, carrier #B3 and carrier #C3, a second stage DCI format may indicate, for example, a carrier indicator field for each of the three data channels, and may indicate, for example, one VRB-to-PRB mapping field for all scheduled carriers. The payload size of the second stage DCI format can be determined based on the total number of scheduled carriers, the bit size of each common field, and the bit size of each carrier-specific field.

It should be understood that Tables 6 and 7 are for illustrative purposes only, and should not be construed as limiting the embodiments of the present disclosure. For example, a first stage DCI format or a second stage DCI format may include fewer or more DCI fields in some other embodiments of the present disclosure. For example, the second stage DCI format may be transmitted on the same carrier as the first stage DCI format, and the carrier indicator may be removed from the first stage DCI format. The bit size of one or more DCI fields in Tables 6 and 7 may be different in some other embodiments of the present disclosure. One or more fields in Table 7 that are set as specific or common may be common or specific in some other embodiments of the present disclosure. For example, the SRS request field may be specific to each scheduled carrier, and the second stage DCI format may thus indicate a SRS request field associates with each scheduled carrier.

In some embodiments of the present disclosure, a BS may notify the UE which DCI field(s) is set as specific or common, for example, via RRC signaling. In some embodiments of the present disclosure, whether a DCI field is a shared DCI field or a separate DCI field may be predefined, for example, in a standard(s).

Figure 6:
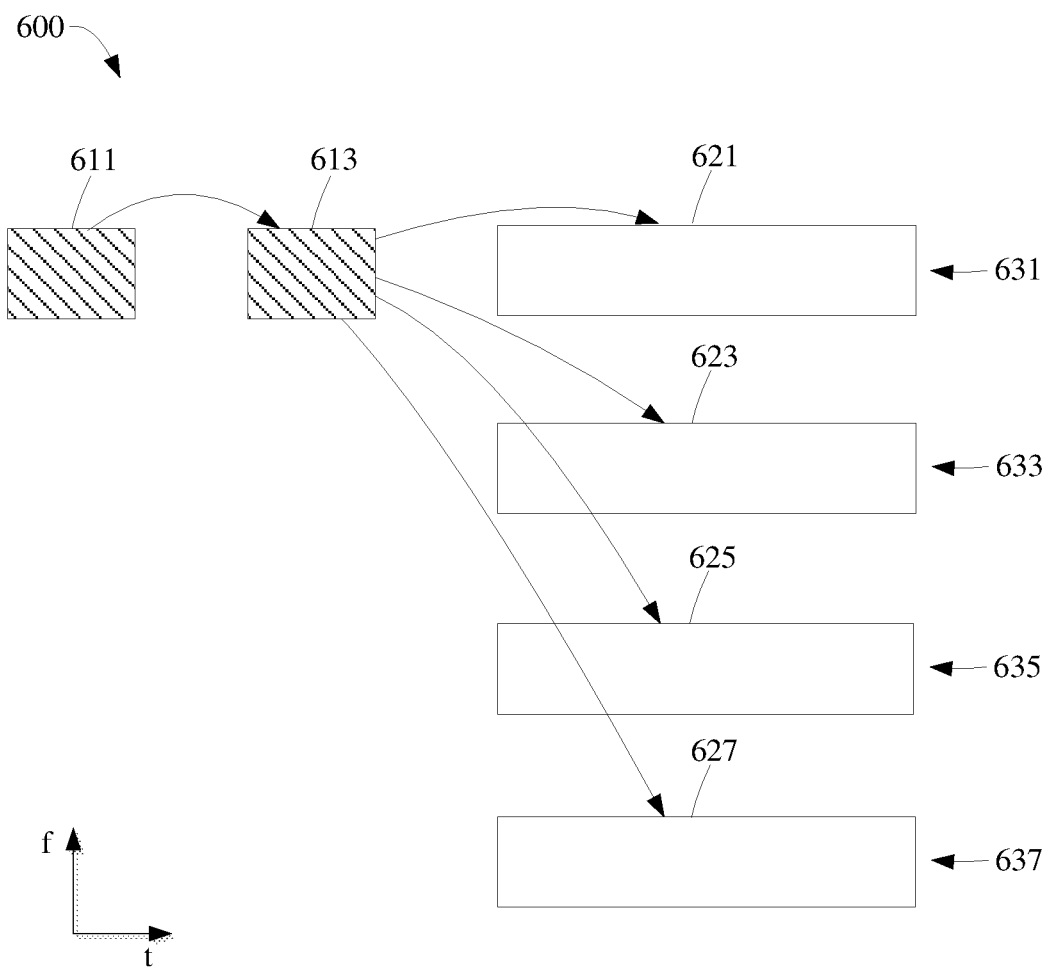
FIG. 6 illustrates a schematic diagram of a two-stage DCI format scheduling a plurality of data channels on a plurality of carriers in accordance with some embodiments of the present disclosure.

FIG. 6 illustrates a schematic diagram 600 of a two-stage DCI format scheduling a plurality of data channels (e.g., PDSCHs or PUSCHs) on a plurality of carriers in accordance with some embodiments of the present disclosure.

Referring to FIG. 6, a plurality of CCs (including but not limited to CCs 631-637) may be configured for a UE. It should be understood that the sub-carrier spacing (SCS) of the carriers configured for the UE may be the same or different. Each of the plurality of CCs may correspond to a respective serving cell of the UE.

As shown in FIG. 6, a BS may transmit a DCI format 611 on a PDCCH on CC 631 to a UE. DCI format 611 may be a first stage DCI format as described above. The UE may receive or decode a DCI format 613 based on DCI format 611. DCI format 613 may transmitted on a PDCCH or a PDSCH on a carrier (e.g., CC 631). DCI format 613 may schedule a plurality of data channels (e.g., data channels 621-627) on a plurality of carriers (e.g., CCs 631-637). The plurality of data channels may be PDSCHs, and the UE may receive the plurality of data channels on the plurality of carriers based on DCI format 613. The plurality of data channels may be PUSCHs, and the UE may transmit the plurality of data channels on the plurality of carriers based on DCI format 613.

Figure 7:
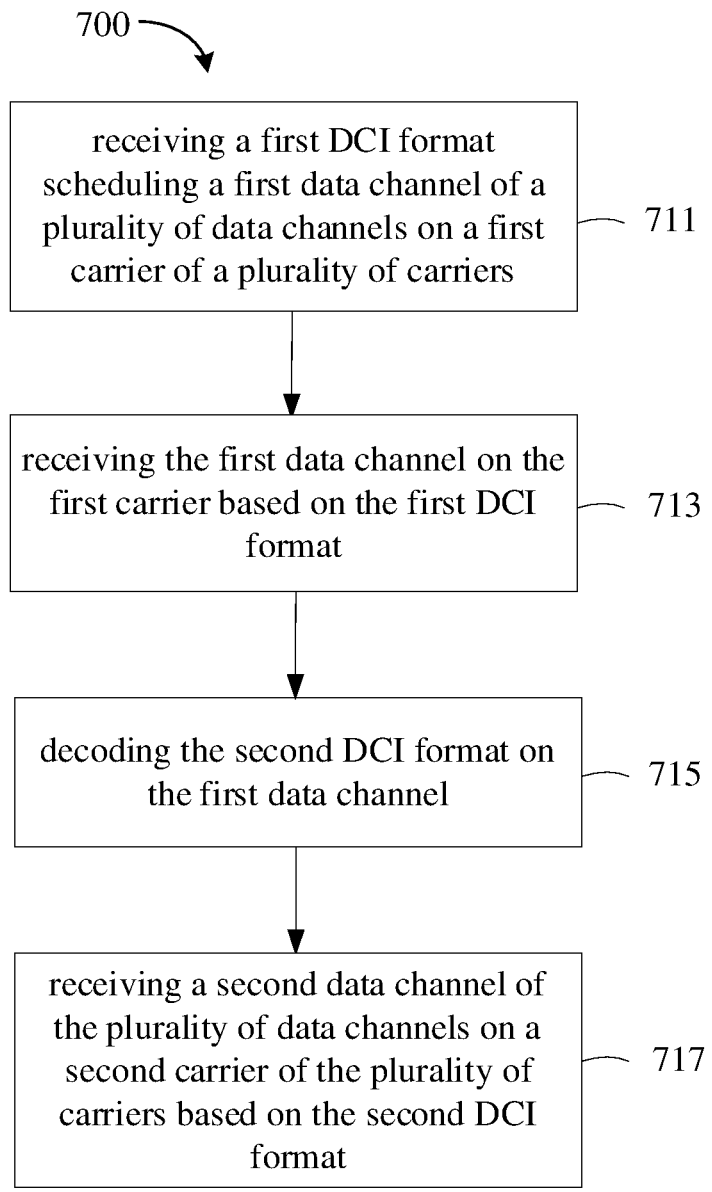
FIG. 7 illustrates a flow chart of an exemplary procedure of wireless communications in accordance with some embodiments of the present disclosure.

FIG. 7 illustrates a flow chart of an exemplary procedure 700 for wireless communications in accordance with some embodiments of the present disclosure. Details described in all of the foregoing embodiments of the present disclosure are applicable for the embodiments shown in FIG. 7. In some examples, the procedure may be performed by a UE, for example, UE 101 in FIG. 1.

Referring to FIG. 7, in operation 711, a UE may receive a first DCI format scheduling a first data channel of a plurality of data channels on a first carrier of a plurality of carriers.

In some examples, the first carrier may be the carrier where the first DCI format is received. In some examples, the first DCI format may indicate the first carrier. In some examples, the first carrier may be the carrier with the lowest or highest carrier index among the plurality of carriers.

The first DCI format may be the first stage DCI format as described above. For example, the first DCI format may include common scheduling information for all of the plurality of carriers and information for decoding a second DCI format. The second DCI format may be the second stage DCI format as described above. For example, the plurality of data channels may include, for example, the first data channel on a first carrier and a second data channel on a second carrier. The second DCI format may include carrier-specific scheduling information for the second carrier of the plurality of carriers.

In some embodiments of the present disclosure, the information for decoding the second DCI format may include a first indicator indicating a parameter for rate matching of the second DCI format on the first data channel. The parameter may be selected from a set of parameters configured by RRC signaling or predefined.

In some embodiments of the present disclosure, the information for decoding the second DCI format may include a second indicator indicating a payload size of the second DCI format. For example, the second indicator may indicate the number of the plurality of carriers or the number of the plurality of carriers minus one.

In some embodiments of the present disclosure, the second DCI format may be modulated by QPSK or a modulation order of the second DCI format may be the same as that of the first data channel. The modulated symbols of the second DCI format may be mapped to symbols immediately following a first DMRS of the first data channel. In some embodiments of the present disclosure, the UE may determine the number of REs for the modulated symbols of the second DCI format based on the first indicator and the second indicator. In some embodiments of the present disclosure, the modulated symbols of the second DCI format may be mapped to symbols in an increasing order of frequency first and time second and followed by the modulated symbols of the first data channel. For example, referring back to FIG. 4, DCI format 415 is mapped immediately after DMRS 413 and before the modulated symbols of data channel 421.

Referring to FIG. 7, in operation 713, the UE may receive the first data channel on the first carrier based on the first DCI format. In operation 715, the UE may decode the second DCI format on the first data channel. For example, the UE may decode the second DCI format based on the information for decoding the second DCI format in the first data channel.

In operation 717, the UE may receive the second data channel of the plurality of data channels on the second carrier of the plurality of carriers based on the second DCI format. For example, the UE may receive the second data channel on the second carrier based on the carrier-specific scheduling information for the second carrier in the second DCI format. In some embodiments of the present disclosure, the first data channel on the first carrier may be scheduled earlier than the second data channel on the second carrier.

It should be appreciated by persons skilled in the art that the sequence of the operations in exemplary procedure 700 may be changed and some of the operations in exemplary procedure 700 may be eliminated or modified, without departing from the spirit and scope of the disclosure.

Figure 8:
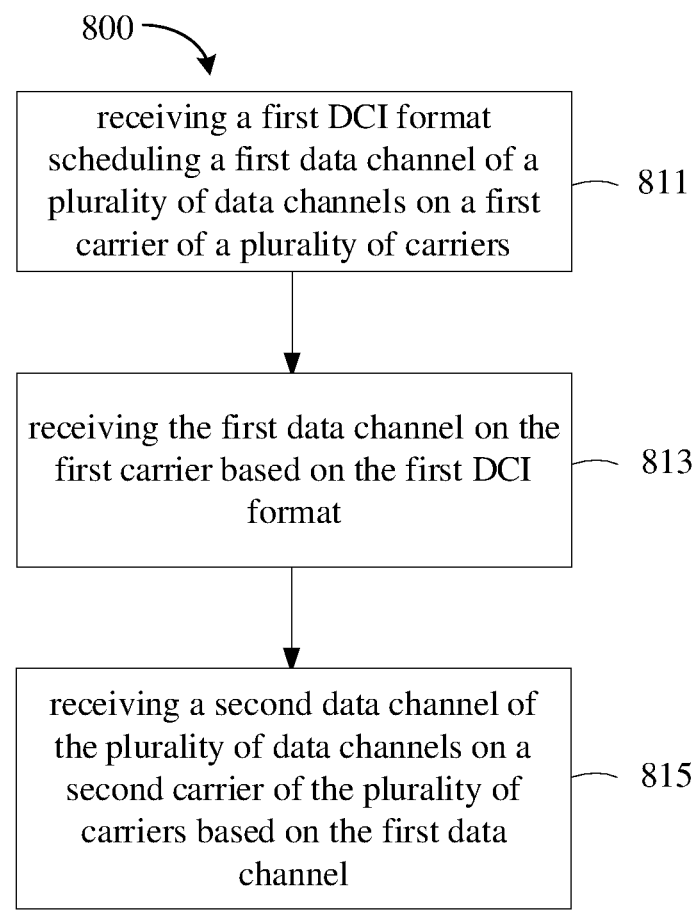
FIG. 8 illustrates a flow chart of an exemplary procedure of wireless communications in accordance with some embodiments of the present disclosure.

FIG. 8 illustrates a flow chart of an exemplary procedure 800 for wireless communications in accordance with some embodiments of the present disclosure. Details described in all of the foregoing embodiments of the present disclosure are applicable for the embodiments shown in FIG. 8. In some examples, the procedure may be performed by a UE, for example, UE 101 in FIG. 1.

Referring to FIG. 8, in operation 811, a UE may receive a first DCI format scheduling a first data channel of a plurality of data channels on a first carrier of a plurality of carriers.

In some examples, the first carrier may be the carrier where the first DCI format is received. In some examples, the first DCI format may indicate the first carrier. In some examples, the first carrier may be the carrier with the lowest or highest carrier index among the plurality of carriers.

The first DCI format may be the first stage DCI format as described above. For example, the first DCI format may include common scheduling information for all of the plurality of carriers. In some embodiments of the present disclosure, the first DCI format may indicate the number of the plurality of carriers or the number of the plurality of carriers minus one.

In operation 813, the UE may receive the first data channel on the first carrier based on the first DCI format. In operation 815, the UE may receive a second data channel of the plurality of data channels on a second carrier of the plurality of carriers based on the first data channel.

In some embodiments of the present disclosure, a MAC CE of the first data channel may include carrier-specific scheduling information for the second carrier of the plurality of carriers. In some embodiments of the present disclosure, the MAC CE may indicate the number of the plurality of carriers or the number of the plurality of carriers minus one.

In some embodiments of the present disclosure, the first data channel on the first carrier may be scheduled earlier than the second data channel on the second carrier.

It should be appreciated by persons skilled in the art that the sequence of the operations in exemplary procedure 800 may be changed and some of the operations in exemplary procedure 800 may be eliminated or modified, without departing from the spirit and scope of the disclosure.

Figure 9:
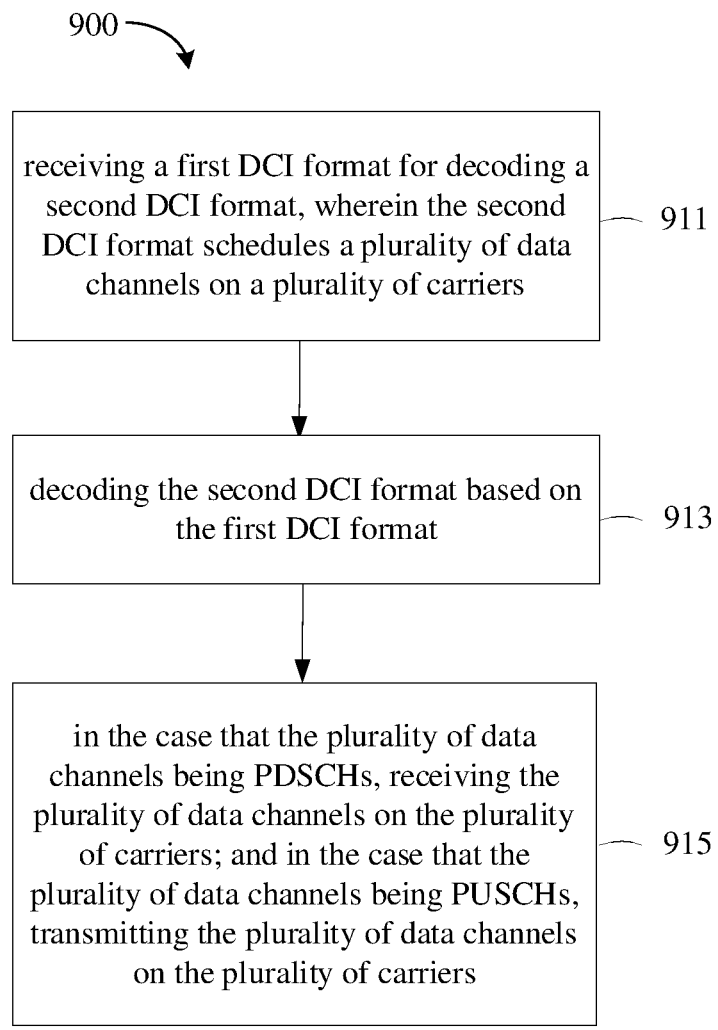
FIG. 9 illustrates a flow chart of an exemplary procedure of wireless communications in accordance with some embodiments of the present disclosure.

FIG. 9 illustrates a flow chart of an exemplary procedure 900 for wireless communications in accordance with some embodiments of the present disclosure. Details described in all of the foregoing embodiments of the present disclosure are applicable for the embodiments shown in FIG. 9. In some examples, the procedure may be performed by a UE, for example, UE 101 in FIG. 1.

Referring to FIG. 9, in operation 911, a UE may receive a first DCI format for decoding a second DCI format. The second DCI format may schedule a plurality of data channels on a plurality of carriers.

The first and second DCI formats may be the first and second stage DCI formats, respectively, as described above. For example, the first DCI format may indicate one or more of: a carrier indicator of the second DCI format, a BWP indicator of the second DCI format, a modulation order of the second DCI format, TDRA information of the second DCI format, FDRA information of the second DCI format, a DMRS pattern of the second DCI format, the number of the plurality of carriers or the number of the plurality of carriers minus one, and a parameter for rate matching of the second DCI format on a data channel on which the second DCI format is carried. For example, the second DCI format may include common scheduling information for the plurality of carriers and carrier-specific scheduling information for each of the plurality of carriers.

In some embodiments of the present disclosure, the UE may determine the payload size of the second DCI format based on the number of the plurality of carriers, a size of common scheduling information for the plurality of carriers, and a size of carrier-specific scheduling information for each of the plurality of carriers.

In operation 913, the UE may decode the second DCI format based on the first DCI format.

In some embodiments of the present disclosure, the second DCI format may be received by the UE on the same carrier as the first DCI format, on the same BWP as the first DCI format, or on the same carrier and the same BWP as the first DCI format. In some embodiments of the present disclosure, the second DCI format may be received by the UE on a carrier indicated by a carrier indicator field in the first DCI format, on a BWP indicated by a BWP indicator field in the first DCI format, or on the carrier and BWP indicated by the carrier indicator field and BWP indicator field in the first DCI format.

In some embodiments of the present disclosure, the UE may receive the second DCI format on a PDCCH or a PDSCH.

In operation 915, the UE may receive the plurality of data channels on the plurality of carriers in the case of the plurality of data channels being PDSCHs, or the UE may transmit the plurality of data channels on the plurality of carriers in the case of the plurality of data channels being PUSCHs. For example, the plurality of data channels may include a first PDSCH on a first carrier. The UE may receive the first PDSCH on the first carrier based on the carrier-specific scheduling information for the first carrier in the second DCI format.

It should be appreciated by persons skilled in the art that the sequence of the operations in exemplary procedure 900 may be changed and some of the operations in exemplary procedure 900 may be eliminated or modified, without departing from the spirit and scope of the disclosure.

Figure 10:
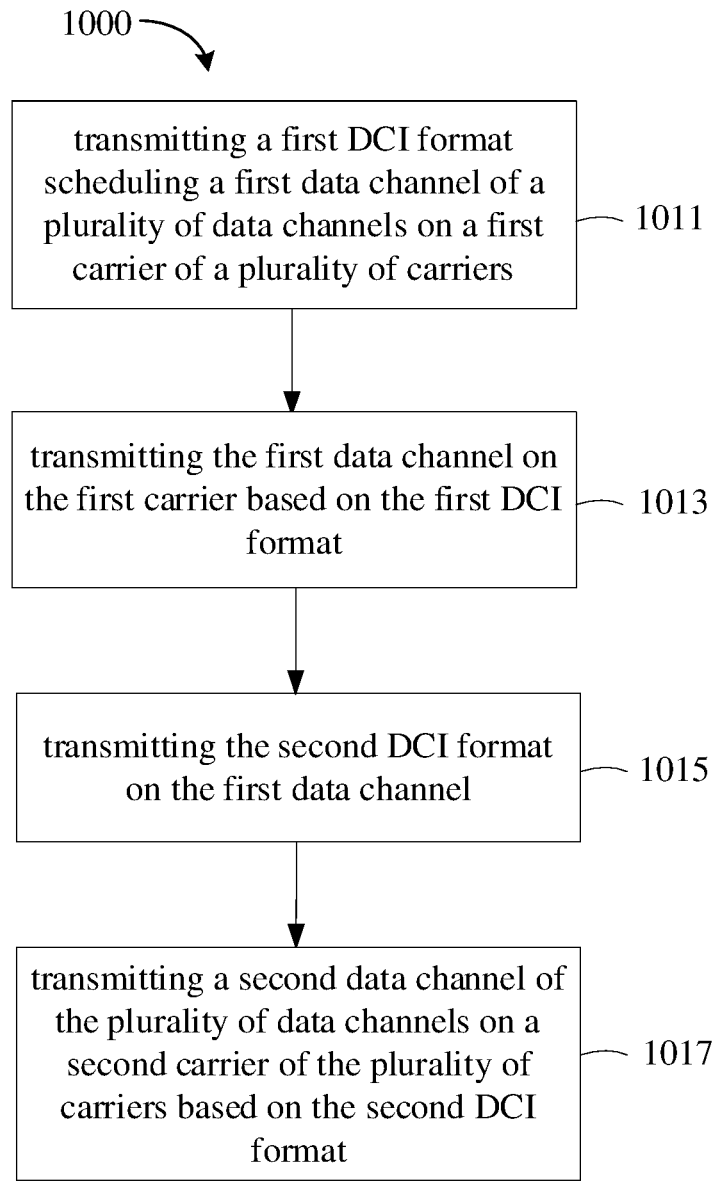
FIG. 10 illustrates a flow chart of an exemplary procedure of wireless communications in accordance with some embodiments of the present disclosure.

FIG. 10 illustrates a flow chart of an exemplary procedure 1000 for wireless communications in accordance with some embodiments of the present disclosure. Details described in all of the foregoing embodiments of the present disclosure are applicable for the embodiments shown in FIG. 10. In some examples, the procedure may be performed by a BS, for example, BS 102 in FIG. 1.

Referring to FIG. 10, in operation 1011, a BS may transmit a first DCI format scheduling a first data channel of a plurality of data channels on a first carrier of a plurality of carriers.

In some examples, the first carrier may be the carrier where the first DCI format is transmitted. In some examples, the first DCI format may indicate the first carrier. In some examples, the first carrier may be the carrier with the lowest or highest carrier index among the plurality of carriers.

The first DCI format may be the first stage DCI format as described above. For example, the first DCI format may include common scheduling information for all of the plurality of carriers and information for decoding a second DCI format. The second DCI format may be the second stage DCI format as described above. For example, the plurality of data channels may include, for example, the first data channel on a first carrier and a second data channel on a second carrier. The second DCI format may include carrier-specific scheduling information for the second carrier of the plurality of carriers.

In some embodiments of the present disclosure, the information for decoding the second DCI format may include a first indicator indicating a parameter for rate matching of the second DCI format on the first data channel. The parameter may be selected from a set of parameters. The BS may transmit the set of parameters via RRC signaling; or the set of parameters may be predefined.

In some embodiments of the present disclosure, the information for decoding the second DCI format may include a second indicator indicating a payload size of the second DCI format. For example, the second indicator may indicate the number of the plurality of carriers or the number of the plurality of carriers minus one.

In some embodiments of the present disclosure, the BS may modulate the second DCI format in QPSK; or the BS may modulate the second DCI format in a modulation order the same as that of the first data channel. The BS may map the modulated symbols of the second DCI format to symbols immediately following a first DMRS of the first data channel. In some embodiments of the present disclosure, the BS may determine the number of REs for the modulated symbols of the second DCI format based on the first indicator and the second indicator. In some embodiments of the present disclosure, the BS may map the modulated symbols of the second DCI format to symbols in an increasing order of frequency first and time second and followed by the modulated symbols of the first data channel. For example, referring back to FIG. 4, DCI format 415 is mapped immediately after DMRS 413 and before the modulated symbols of data channel 421.

Referring to FIG. 10, in operation 1013, the BS may transmit the first data channel on the first carrier based on the first DCI format. In operation 1015, the BS may transmit the second DCI format on the first data channel. In operation 1017, the BS may transmit the second data channel of the plurality of data channels on the second carrier of the plurality of carriers based on the second DCI format. In some embodiments of the present disclosure, the first data channel on the first carrier may be scheduled earlier than the second data channel on the second carrier.

It should be appreciated by persons skilled in the art that the sequence of the operations in exemplary procedure 1000 may be changed and some of the operations in exemplary procedure 1000 may be eliminated or modified, without departing from the spirit and scope of the disclosure.

Figure 11:
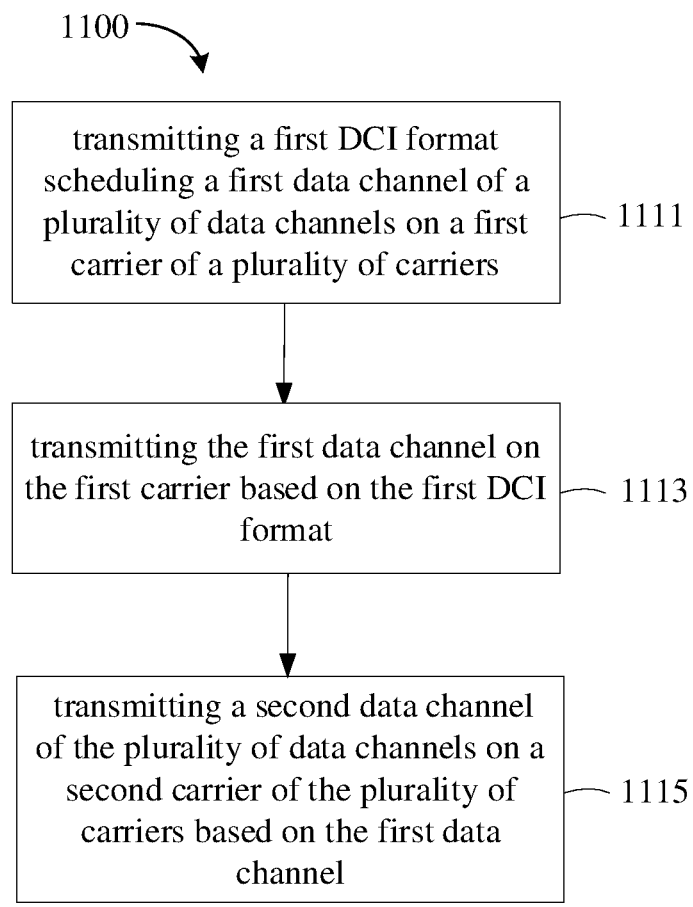
FIG. 11 illustrates a flow chart of an exemplary procedure of wireless communications in accordance with some embodiments of the present disclosure.

FIG. 11 illustrates a flow chart of an exemplary procedure 1100 for wireless communications in accordance with some embodiments of the present disclosure. Details described in all of the foregoing embodiments of the present disclosure are applicable for the embodiments shown in FIG. 11. In some examples, the procedure may be performed by a BS, for example, BS 102 in FIG. 1.

Referring to FIG. 11, in operation 1111, a BS may transmit a first DCI format scheduling a first data channel of a plurality of data channels on a first carrier of a plurality of carriers.

In some examples, the first carrier may be the carrier where the first DCI format is transmitted. In some examples, the first DCI format may indicate the first carrier. In some examples, the first carrier may be the carrier with the lowest or highest carrier index among the plurality of carriers.

The first DCI format may be the first stage DCI format as described above. For example, the first DCI format may include common scheduling information for all of the plurality of carriers. In some embodiments of the present disclosure, the first DCI format may indicate the number of the plurality of carriers or the number of the plurality of carriers minus one.

In operation 1113, the BS may transmit the first data channel on the first carrier based on the first DCI format. In operation 1115, the BS may transmit a second data channel of the plurality of data channels on a second carrier of the plurality of carriers based on the first data channel.

In some embodiments of the present disclosure, a MAC CE of the first data channel may include carrier-specific scheduling information for the second carrier of the plurality of carriers. In some embodiments of the present disclosure, the MAC CE may indicate the number of the plurality of carriers or the number of the plurality of carriers minus one.

In some embodiments of the present disclosure, the first data channel on the first carrier may be scheduled earlier than the second data channel on the second carrier.

It should be appreciated by persons skilled in the art that the sequence of the operations in exemplary procedure 1100 may be changed and some of the operations in exemplary procedure 1100 may be eliminated or modified, without departing from the spirit and scope of the disclosure.

Figure 12:
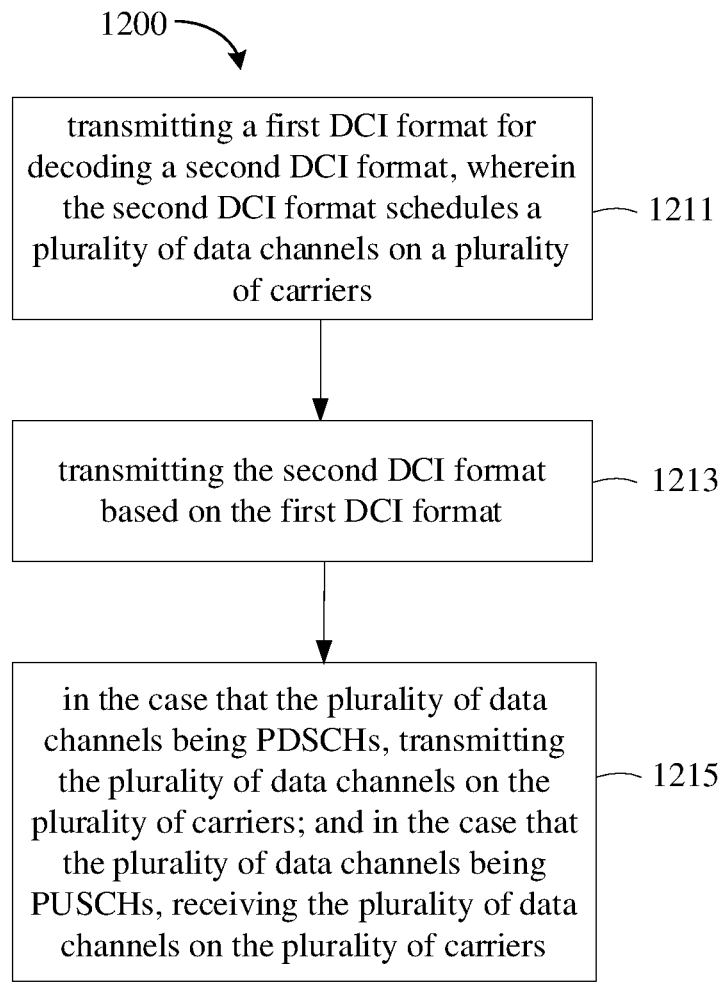
FIG. 12 illustrates a flow chart of an exemplary procedure of wireless communications in accordance with some embodiments of the present disclosure.

FIG. 12 illustrates a flow chart of an exemplary procedure 1200 for wireless communications in accordance with some embodiments of the present disclosure. Details described in all of the foregoing embodiments of the present disclosure are applicable for the embodiments shown in FIG. 12. In some examples, the procedure may be performed by a BS, for example, BS 102 in FIG. 1.

Referring to FIG. 12, in operation 1211, a BS may transmit a first DCI format for decoding a second DCI format. The second DCI format may schedule a plurality of data channels on a plurality of carriers.

The first and second DCI formats may be the first and second stage DCI formats, respectively, as described above. For example, the first DCI format may indicate one or more of: a carrier indicator of the second DCI format, a BWP indicator of the second DCI format, a modulation order of the second DCI format, TDRA information of the second DCI format, FDRA information of the second DCI format, a DMRS pattern of the second DCI format, the number of the plurality of carriers or the number of the plurality of carriers minus one, and a parameter for rate matching of the second DCI format on a data channel on which the second DCI format is carried. For example, the second DCI format may include common scheduling information for the plurality of carriers and carrier-specific scheduling information for each of the plurality of carriers.

In some embodiments of the present disclosure, the BS may determine the payload size of the second DCI format based on the number of the plurality of carriers, a size of common scheduling information for the plurality of carriers, and a size of carrier-specific scheduling information for each of the plurality of carriers.

In operation 1213, the BS may transmit the second DCI format based on the first DCI format.

In some embodiments of the present disclosure, the BS may transmit the second DCI format on the same carrier as the first DCI format, on the same BWP as the first DCI format, or on the same carrier and the same BWP as the first DCI format. In some embodiments of the present disclosure, the BS may transmit the second DCI format on a carrier indicated by a carrier indicator field in the first DCI format, on a BWP indicated by a BWP indicator field in the first DCI format, or on the carrier and BWP indicated by the carrier indicator field and BWP indicator field in the first DCI format.

In some embodiments of the present disclosure, the BS may transmit the second DCI format on a PDCCH or a PDSCH.

In operation 1215, the BS may transmit the plurality of data channels on the plurality of carriers in the case of the plurality of data channels being PDSCHs, or the BS may receive the plurality of data channels on the plurality of carriers in the case of the plurality of data channels being PUSCHs. For example, the plurality of data channels may include a first PDSCH on a first carrier. The BS may transmit the first PDSCH on the first carrier based on the carrier-specific scheduling information for the first carrier in the second DCI format.

It should be appreciated by persons skilled in the art that the sequence of the operations in exemplary procedure 1200 may be changed and some of the operations in exemplary procedure 1200 may be eliminated or modified, without departing from the spirit and scope of the disclosure.

Figure 13:
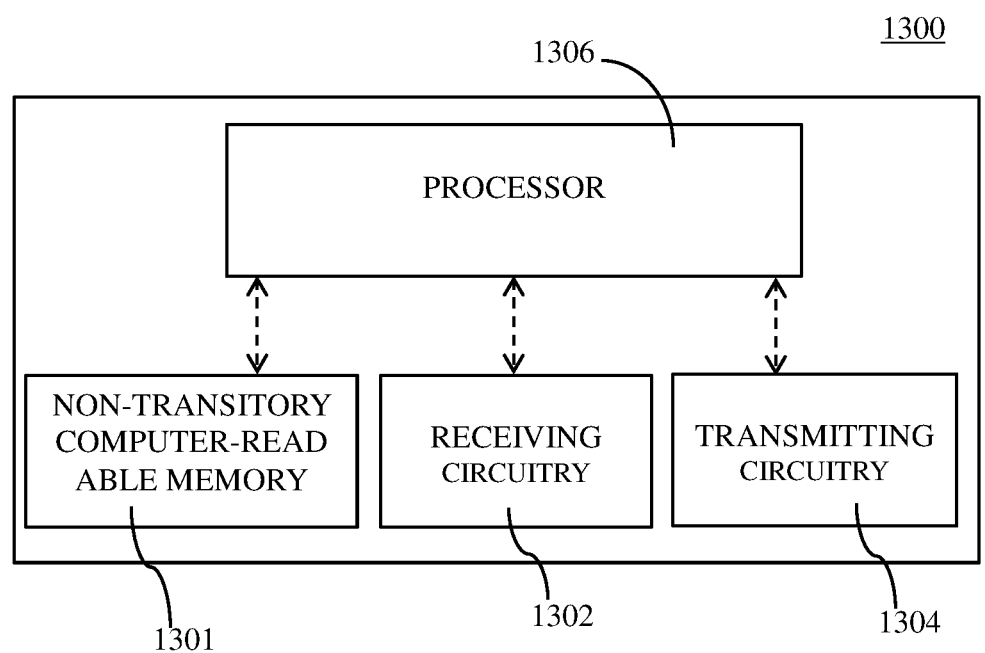
FIG. 13 illustrates a block diagram of an exemplary apparatus in accordance with some embodiments of the present disclosure.

FIG. 13 illustrates a block diagram of an exemplary apparatus 1300 according to some embodiments of the present disclosure.

As shown in FIG. 13, the apparatus 1300 may include at least one non-transitory computer-readable medium 1301, at least one receiving circuitry 1302, at least one transmitting circuitry 1304, and at least one processor 1306 coupled to the non-transitory computer-readable medium 1301, the receiving circuitry 1302 and the transmitting circuitry 1304.

The apparatus 1300 may be a base station side apparatus (e.g., a BS) or a communication device (e.g., a UE).

Although in this figure, elements such as the at least one processor 1306, transmitting circuitry 1304, and receiving circuitry 1302 are described in the singular, the plural is contemplated unless a limitation to the singular is explicitly stated. In some embodiments of the present application, the receiving circuitry 1302 and the transmitting circuitry 1304 are combined into a single device, such as a transceiver. In certain embodiments of the present application, the apparatus 1300 may further include an input device, a memory, and/or other components.

In some embodiments of the present disclosure, the non-transitory computer-readable medium 1301 may have stored thereon computer-executable instructions to cause a processor to implement the method with respect to the UEs as described above. For example, the computer-executable instructions, when executed, cause the processor 1306 interacting with receiving circuitry 1302 and transmitting circuitry 1304, so as to perform the operations with respect to the UEs described in FIGS. 1-9.

In some embodiments of the present disclosure, the non-transitory computer-readable medium 1301 may have stored thereon computer-executable instructions to cause a processor to implement the method with respect to the BSs as described above. For example, the computer-executable instructions, when executed, cause the processor 1306 interacting with receiving circuitry 1302 and transmitting circuitry 1304, so as to perform the operations with respect to the BSs described in FIGS. 1-6 and 10-12.

Those having ordinary skill in the art would understand that the operations or steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations or steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including." Expressions such as "A and/or B" or "at least one of A and B" may include any and all combinations of words enumerated along with the expression. For instance, the expression "A and/or B" or "at least one of A and B" may include A, B, or both A and B. The wording "the first," "the second" or the like is only used to clearly illustrate the embodiments of the present application, but is not used to limit the substance of the present application.

What is claimed:

1. An apparatus, comprising:
   a receiving circuitry;
   a transmitting circuitry; and
   a processor coupled to the receiving circuitry and the transmitting circuitry configured to cause the apparatus to:
      receive a first downlink control information (DCI) format scheduling a first data channel of a plurality of data channels on a first carrier of a plurality of carriers, wherein the first DCI format includes common scheduling information for all of the plurality of carriers and information for decoding a second DCI format;
      receive the first data channel on the first carrier based on the first DCI format;
      decode the second DCI format on the first data channel; and
      receive a second data channel of the plurality of data channels on a second carrier of the plurality of carriers based on the second DCI format.

2. The apparatus of claim 1, wherein the second DCI format includes carrier-specific scheduling information for the second carrier of the plurality of carriers.

3. The apparatus of claim 1, wherein:
   the first carrier is a carrier where the first DCI format is received;
   the first DCI format indicates the first carrier; or
   the first carrier is a carrier with a lowest or highest carrier index among the plurality of carriers.

4. The apparatus of claim 1, wherein the information for decoding the second DCI format includes at least one of:
   a first indicator indicating a parameter for rate matching of the second DCI format on the first data channel; or
   a second indicator indicating a payload size of the second DCI format.

5. The apparatus of claim 4, wherein the second indicator indicates a number of the plurality of carriers or the number of the plurality of carriers minus one.

6. The apparatus of claim 1, wherein modulated symbols of the second DCI format are at least one of:
   mapped to symbols immediately following a first demodulation reference signal (DMRS) of the first data channel; and
   mapped to symbols in an increasing order of frequency first and time second and followed by modulated symbols of the first data channel.

7. The apparatus of claim 4, wherein the processor is configured to cause the apparatus to:
   determine a number of resource elements (REs) for modulated symbols of the second DCI format based on the first indicator and the second indicator.

8. An apparatus, comprising:
   a receiving circuitry;
   a transmitting circuitry; and a processor coupled to the receiving circuitry and the transmitting circuitry configured to cause the apparatus to:

receive a first downlink control information (DCI) format scheduling a first data channel of a plurality of data channels on a first carrier of a plurality of carriers, wherein the first DCI format includes common scheduling information for all of the plurality of carriers;

receive the first data channel on the first carrier based on the first DCI format; and receive a second data channel of the plurality of data channels on a second carrier of the plurality of carriers based on the first data channel.

9. The apparatus of claim 8, wherein:
the first carrier is a carrier where the first DCI format is received;
the first DCI format indicates the first carrier; or
the first carrier is a carrier with a lowest or highest carrier index among the plurality of carriers.

10. The apparatus of claim 8, wherein a media access control (MAC) control element (CE) of the first data channel includes carrier-specific scheduling information for the second carrier of the plurality of carriers.

11. The apparatus of claim 10, wherein the first DCI format or the MAC CE indicates a number of the plurality of carriers or the number of the plurality of carriers minus one.

12. An apparatus, comprising:
a receiving circuitry;
a transmitting circuitry; and
a processor coupled to the receiving circuitry and the transmitting circuitry configured to cause the apparatus to:

receive a first downlink control information (DCI) format for decoding a second DCI format, wherein the second DCI format schedules a plurality of data channels on a plurality of carriers;

decode the second DCI format based on the first DCI format;

in a case of the plurality of data channels being physical downlink shared channels (PDSCHs), receive the plurality of data channels on the plurality of carriers; and in a case of the plurality of data channels being physical uplink shared channels (PUSCHs), transmit the plurality of data channels on the plurality of carriers.

13. The apparatus of claim 12, wherein the first DCI format indicates one or more of:
a carrier indicator of the second DCI format,
a bandwidth part (BWP) indicator of the second DCI format,
a modulation order of the second DCI format,
time domain resource allocation information of the second DCI format,
frequency domain resource allocation information of the second DCI format,
a demodulation reference signal (DMRS) pattern of the second DCI format,
a number of the plurality of carriers or the number of the plurality of carriers minus one, and
a parameter for rate matching of the second DCI format on a data channel on which the second DCI format is carried.

14. The apparatus of claim 12, wherein the processor is configured to cause the apparatus to:
receive the second DCI format on a same carrier as the first DCI format, on a same bandwidth part (BWP) as the first DCI format, or on the same carrier and the same BWP as the first DCI format; and
determine a payload size of the second DCI format based on a number of the plurality of carriers, a size of common scheduling information for the plurality of carriers, and a size of carrier-specific scheduling information for each of the plurality of carriers.

15. The apparatus of claim 12, wherein the second DCI format includes common scheduling information for the plurality of carriers and carrier-specific scheduling information for each of the plurality of carriers.

16. The apparatus of claim 8, wherein the first DCI format indicates a number of the plurality of carriers or the number of the plurality of carriers minus one.

17. An apparatus, comprising:
a receiving circuitry;
a transmitting circuitry; and
a processor coupled to the receiving circuitry and the transmitting circuitry configured to cause the apparatus to:

transmit, to a user equipment (UE), a first downlink control information (DCI) format scheduling a first data channel of a plurality of data channels on a first carrier of a plurality of carriers, wherein the first DCI format includes common scheduling information for all of the plurality of carriers;

transmit, to the UE, the first data channel on the first carrier based on the first DCI format; and transmit, to the UE, a second data channel of the plurality of data channels on a second carrier of the plurality of carriers based on the first data channel.

18. The apparatus of claim 17, wherein:
the first carrier is a carrier where the first DCI format is transmitted;
the first DCI format indicates the first carrier; or
the first carrier is a carrier with a lowest or highest carrier index among the plurality of carriers.

19. The apparatus of claim 17, wherein a media access control (MAC) control element (CE) of the first data channel includes carrier-specific scheduling information for the second carrier of the plurality of carriers.

20. The apparatus of claim 19, wherein the first DCI format or the MAC CE indicates a number of the plurality of carriers or the number of the plurality of carriers minus one.

* * * * *